No. 861,419. PATENTED JULY 30, 1907.
J. S. YOUNG.
STONE CUTTING SAW.
APPLICATION FILED DEC. 31, 1904.

2 SHEETS—SHEET 1.

WITNESSES:
F. C. Gibson.
John T. Schrott.

INVENTOR
James S. Young.

BY
Fred G. Dieterich
ATTORNEY

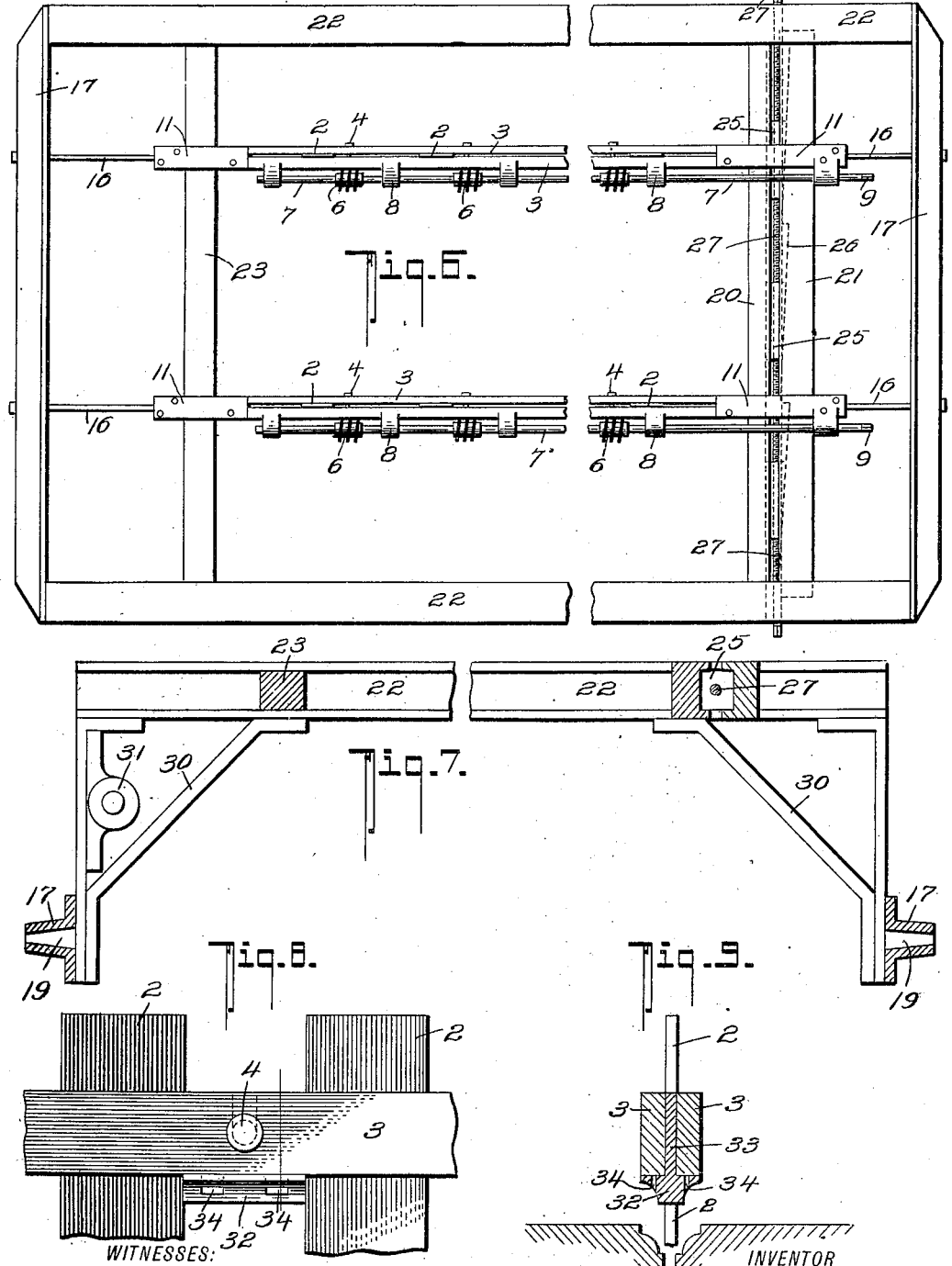

UNITED STATES PATENT OFFICE.

JAMES S. YOUNG, OF SACRAMENTO, CALIFORNIA.

STONE-CUTTING SAW.

No. 861,419.  Specification of Letters Patent.  Patented July 30, 1907.

Application filed December 31, 1904. Serial No. 239,158.

*To all whom it may concern:*

Be it known that I, JAMES SYLVESTER YOUNG, a citizen of the United States of America, residing at Sacramento, California, have invented new and useful Improvements in Stone-Cutting Saws, of which the following is a specification.

This invention relates to a stone cutting saw which will more freely cut its way through either hard or soft stone than those at present in use and that can more readily be adapted to the requirements of varied work in regard either to the hardness of the material or the size of the block it may be desired to cut.

It is designed as an improvement on the invention revealed in U. S. Patent No. 636,094, issued to me on the 31st day of October, 1899.

In stone cutting saws generally the work of cutting is really performed by abrasion of the material of the stone by fine chilled shot which is freely fed into the cut and rolls under the lower edge of the saw blade.
With this method of cutting if the entire length of the blade has a bearing on the stone a sufficient pressure is not brought to bear on the individual units of the chilled shot to enable them to perform the work of abrasion rapidly, and further, the abraded material or slime of the cut cannot freely escape from under the edge of the blade but remains in the groove and prevents contact of the chilled shot with the uncut stone, thereby diminishing the efficiency of the shot to abrade the stone. To avoid these defects, instead of using an extended saw blade, I secure a series of thin flat blade members vertically adjustable in an upright position in a bar the desired length of the saw, with which arrangement the chilled shot by which the cutting or abrasion is performed will interpose themselves between these ends and the stone. As the end area of these blade members is less than the edge area of a continuous blade length the pressure per unit of shot will be greater and a greater abrasive effect on the stone will result. Further the interrupted blade area in the cut enables the groove to be kept free from the slime of cutting and quicker work is performed.

I also provide a means whereby the several blade members of each saw may be simultaneously tightened or released in the bar so that they may be more quickly adjusted to compensate for their unequal wear, for the blade members toward the middle of the saw will wear more rapidly than those toward the ends.

Figure 1:
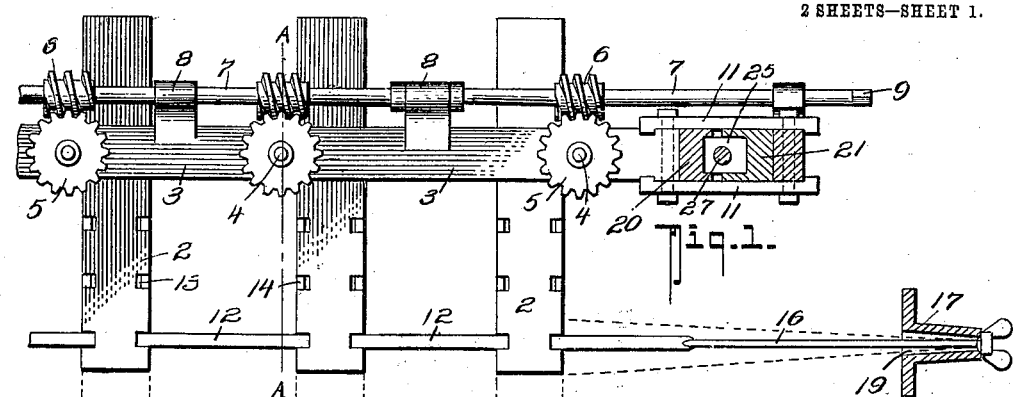
Figure 5:
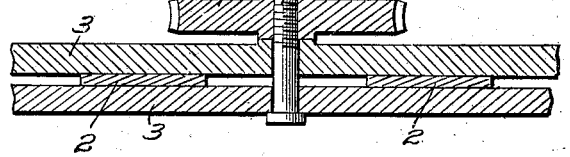

There are also several novel features of construction to which attention is drawn in the following specification and illustrated in the drawings which accompany it. Figure 1, being a side elevation of a portion of saw made in accordance with my invention, Fig. 2, a plan of the same, Fig. 3, an enlarged section on the line A A in Fig. 1, Fig. 4, a detail section showing the stay strips between adjacent blade members, Fig. 5, a detail section showing a modification in the manner of securing the blade members in the bar Fig. 6, a general plan of a saw frame showing a means for securing the saws therein, Fig. 7, a sectional elevation of one of the side members of the saw frame, Figs. 8 & 9, show the application of cutters by which moldings etc. may be formed on the corners of the cut stone.

Figure 2:
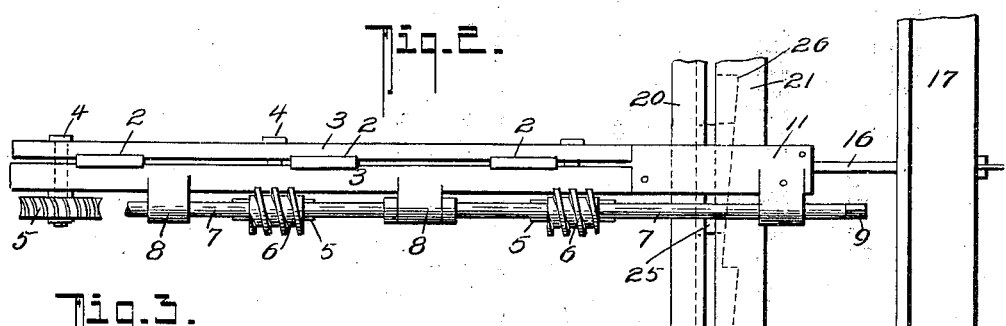
Figure 3:
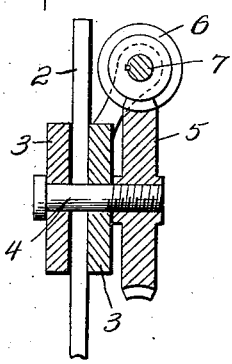

Each saw consists of a series of thin flat blade members 2 arranged, see Figs. 1 & 2 in an upright position in a bar forming the back of the saw and secured therein in any suitable manner. Preferably this back bar is composed of two members 3 between which the blade members 2 may be gripped by screws 4 adjacent to the blade members, or between each pair. The blade members may for light work depend for their steadiment merely on the friction of the grip as in Fig. 5 or they may be recessed slightly into either one or both bars as shown in Figs. 2, 3, and 6. The bolts 4 may be provided with ordinary nuts to be tightened with a wrench, but to enable the blade members of each saw to be simultaneously tightened or released, I form the nut of each bolt in the center or boss of a worm wheel 5 into the teeth of which a worm 6 meshes. The worms 6 are secured on a light shaft 7 supported in bearings 8 along one of the back bars 3 and extending beyond one or both ends of the saw frame in which the saws are carried, each end of the shaft 7 being provided with a square 9 on which a crank handle or wheel may be placed. To the ends of the bars 3 are secured clips 11 by which they may be fastened to the end bars 20, 21, and 23 of the reciprocating saw frame, the manner of fastening being such that the saws may be slidably movable laterally in the frame to suit the desired width of space between cuts and may be secured there by a means to be described later. This constitutes the simple element of the invention, which is to provide vertically adjustable saw blade members of limited end operating area.

Figure 4:
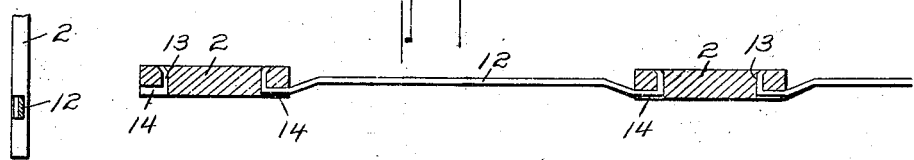

Under ordinary circumstances the strength of the blade members is sufficient to stand the strain of their work, but to afford them support where such may be necessary, I provide between the lower ends of the blade members, strip stays 12 of thin flat steel. Each end of these strips stays is bent as shown in Fig. 4 to enter a narrow slot 13 in the blade members, a recess 14 being provided at one side from the slot to the edge of the blade, the depth of the recess being greater than the thickness of the strip and at the back the slot is slightly beveled as drawn to receive the upset or rivet-over of the inserted strip end.

The ends of the strip stays are not headed or permanently secured to the blades but are merely bent over slightly so that the strips 12 are removably connected to the blades and may be removed from one slot to another as occasion may require, and when I use the term "upset or rivet over of the inserted strip end" I do not desire it understood by this expression that the strip ends are to be headed or in any way permanently secured to the blades.

From each end blade member a stay 16 connects the series of blades to a cross beam 17 secured to a downwardly projecting bracket 30, on each side member 22 of the saw frame the connection being made through a laterally elongated slotted opening 19 so that the saws may be moved to any desired position in the width of the saw frame and the slot 19 is enlarged toward the saw to permit of the blade members being raised or lowered within reasonable limits.

The blade members are each provided with several of the slots 13 so that as the blades wear down the strip stays 12 may be moved to the next slot higher.

The reciprocating saw frame which carries the saws is composed of side members 22 and end members 20, 21 and 23, 20 and 23 being secured to the ends of the side members 22, and 21 movable outward from 20 so as to tighten the saws in the frame by means of the clips 11. The movable member 21 is slidable in one end of the side members 22 and its outward movement is operated by a series of wedge blocks 25 endwise slidable between 20 and 21, the inner adjacent side of one of the bars being provided with inclined faces 26 to correspond with the taper of the wedge blocks. A screwed rod 27 is threaded through each of the blocks 25 and being carried through one or both of the side frames 22 and secured in any approved manner against end movement therein if the rod is rotated by a crank handle or hand wheel on the squared outer end of the rod the wedge blocks may be moved endwise and will tighten or release the clips 11 of each saw. Thus the saws being set in the frame to the width apart of the block it is desired to cut, they may be secured in such positions by the outward movement of the bar 21 in the manner described.

The ends of the side members 22 of the saw frame are produced beyond the connection of the end members 20 and 23 and downwardly projecting brackets 30 are secured to the extension. To the lower ends of these brackets is secured the open or slotted cross beam 17 which receives the stay rods 16 from the blade members, and in each of these brackets 30 between their attachment to the side members and the attachment of the cross beam 17 is the pin or bearing 31 to which are connected the rods by which the frame is reciprocated, so that the application of the reciprocating effort is approximate to the resistance of the cut transmitted through the blade members.

Cutters 32 may be provided between the blade members having a thin flat portion 33 which will be gripped between the bars 3. By these cutters moldings, chamfers &c may be cut on the corners of the blocks of sawed stone, the cutters being formed with apertures 34 through which chilled shot may be fed while the work is being done.

With a saw constructed as described the work will not only be more rapidly and efficiently performed, but the wear of the blade members may be quickly compensated for by readjustment of their length; as a slab or board being placed under the row of blade members in each saw and the clamping screws slackened back the blade members will drop or may be tapped lightly to a uniform level and the clamps retightened. The facility also by which the molding cutters may be applied to the same saw device is an advantage of considerable importance.

Having now particularly described my invention and the manner of its operation, I hereby declare that what I claim as new and desire to be protected in by Letters Patent is:

1. In a stone saw, the combination of a saw beam, a series of long bearing blades carried thereby, and means interposed between adjacent blades for reinforcing the lower ends of the blades.

2. In a stone saw, a pair of clamping bars, a series of thin flat blade members arranged at intervals apart between said bars, a plurality of clamping means including bolts and nuts for clamping the bars together, means for simultaneously operating all of said clamping means, and means for securing the bars in the reciprocating frame of the machine.

3. In a stone saw, a series of thin flat blade members vertically arranged at intervals apart between two bars, which are recessed slightly to receive them, bolts clamping the bars together, means for simultaneously operating the nuts of the bolts and means securing the bars in the reciprocating frame of the machine.

4. In a stone saw, a series of thin flat blade members vertically arranged at intervals apart between two bars, bolts by which the bars may be clamped together to secure the blade members, worm wheels forming the nuts of the clamping bolts, a shaft rotatably mounted in bearings along one of the clamping bars, worms secured to the shaft and meshing with the teeth of each worm wheel, and means for securing the bar of the saw in the reciprocating frame of the machine.

5. In a stone saw, means for securing the saws in the reciprocating frame of the machine, such means comprising, an end frame member parallel to and outwardly movable from one of the fixed end members of the reciprocating frame, wedge members endwise slidable between the fixed and movable end members of the frame, clips secured to the bar which carries the saw blade members, which clips engage the outer side of a fixed end member of the frame at one end and the outer edges of the movable end member at the other end, and a rotatable screw passing through the wedge members whereby they may be moved endwise and move the end member of the frame outward to tighten the frame within the clips of the saws.

6. In a stone saw, a series of blade members vertically held toward their upper ends in the bar by which the saw is secured in the reciprocating frame of the machine, means for connecting together and supporting the lower ends of the blade, members comprising, a series of thin flat ties extending between the blade members and from the end blade members outward, and a cross beam at each end between the side members of the saw frame to which the tie strips of the end blades may be removably connected.

7. In a stone saw, a series of blade members vertically secured toward their upper ends in a bar by which the saw is secured in the reciprocating frame of the machine, a downwardly projecting bracket at each end of the side members of the reciprocating frame, a beam across from side to side from the lower ends of these brackets, and a series of thin flat ties extending from the cross beams to and between the lower end of each blade member of the saw.

8. In a stone cutting saw, a series of blade members supported between bars from which the blade members downwardly project, said bars being connected to the end members of the reciprocating saw frame, brackets downwardly projecting from each end of the side members of the reciprocating frame, cross beams secured to the lower end of the downwardly projecting brackets, tie strips from the cross beam to the adjacent edge of the nearest blade member in each saw and similar strips between each pair of blade members, whereby the strain on the lower ends of the blade members is carried to the reciprocating frame, and means for connecting the rods by which the frame is reciprocated to the downwardly projecting brackets of the reciprocating frame between the cross beam connection and the side member of the reciprocating frame.

9. In a saw of the class described wherein saw blade members are arranged vertically at intervals apart between bars, the combination therewith of molding cutters, each comprising, a flattened portion adapted to fit between the blade holding bar members of the saw, and a downwardly projecting portion shaped in cross section to the required form of molding.

10. In a stone saw, the combination of a saw beam, a series of long bearing blades carried thereby, and means interposed between adjacent blades for reinforcing the lower ends of the blades during the initial part of a cutting operation.

11. In a stone saw, the combination of a saw beam, a series of long bearing blades carried thereby, and removable means for reinforcing the lower ends of the blades during the initial part of a cutting operation.

12. In a stone saw, the combination of a saw beam, a series of long bearing blades carried thereby, and a series of means for reinforcing the lower ends of the blades, substantially as shown and described.

13. In a stone saw, the combination of a saw beam, a series of long bearing blades carried thereby, and a series of means for reinforcing the lower ends of the blades, during the initial part of a cutting operation.

14. In a stone saw, the combination of a saw beam, a series of long bearing blades carried thereby and removable means for reinforcing the lower ends of the blades, substantially as shown and described.

15. In a stone saw, means for securing the saws in the reciprocating frame of the machine, said means comprising an end frame member parallel to and movable from one of the fixed end members of the reciprocating frame, wedge members slidable between the fixed and movable end members of the machine, means secured to the bar which carries the saw blade members for engaging the outer side of a fixed end member of the frame at one end, and the outer edges of the movable end members at the other end, and a rotatable screw passing through the wedge members whereby they may be moved endwise and move the end member of the frame outward to tighten the frame within the said means that is secured to the saw carrying bar.

16. In a saw of the class described, wherein saw blade members are arranged vertically at intervals apart between bars, the combination therewith of molding cutters secured between the blades substantially as shown and described.

In testimony whereof I have signed my name to this specification in the presence of two subscribing witnesses.

JAMES S. YOUNG.

Witnesses:
ROWLAND BRITTAIN,
ELLICE WEBBER.